United States Patent [19]
Edwards et al.

[11] 3,979,935
[45] Sept. 14, 1976

[54] STRIP SHAPE MEASURING DEVICE

[75] Inventors: William John Edwards, Coal Point; John Frederick Easey, Charlestown, both of Australia

[73] Assignee: John Lysaght (Australia) Limited, Sydney, Australia

[22] Filed: Feb. 7, 1975

[21] Appl. No.: 547,990

[30] Foreign Application Priority Data
Feb. 12, 1974 Australia.............................. 6563/74

[52] U.S. Cl........................................ 72/16; 73/159
[51] Int. Cl.²........................................ B21B 37/02
[58] Field of Search.................. 72/8, 9, 10, 11, 12, 72/16, 17; 73/159, 95.5

[56] References Cited
UNITED STATES PATENTS

| | | | |
|---|---|---|---|
| 3,334,508 | 8/1967 | Martin | 72/9 X |
| 3,499,306 | 3/1970 | Pearson | 72/17 |
| 3,518,441 | 6/1970 | Selgin | 250/219 |

*Primary Examiner*—Milton S. Mehr
*Attorney, Agent, or Firm*—Weingarten, Maxham & Schurgin

[57] ABSTRACT

For use in a rolling mill, a deformable, deflection roll with a continuous, unitary surface and a system for detection of roll deflection when a strip of sheet material is passed over the roll. The roll construction may include a dimpled or perforated surface or a multilayered roll may be provided of appropriate materials. The deflection detection system typically employs an optical scanning technique.

8 Claims, 1 Drawing Figure

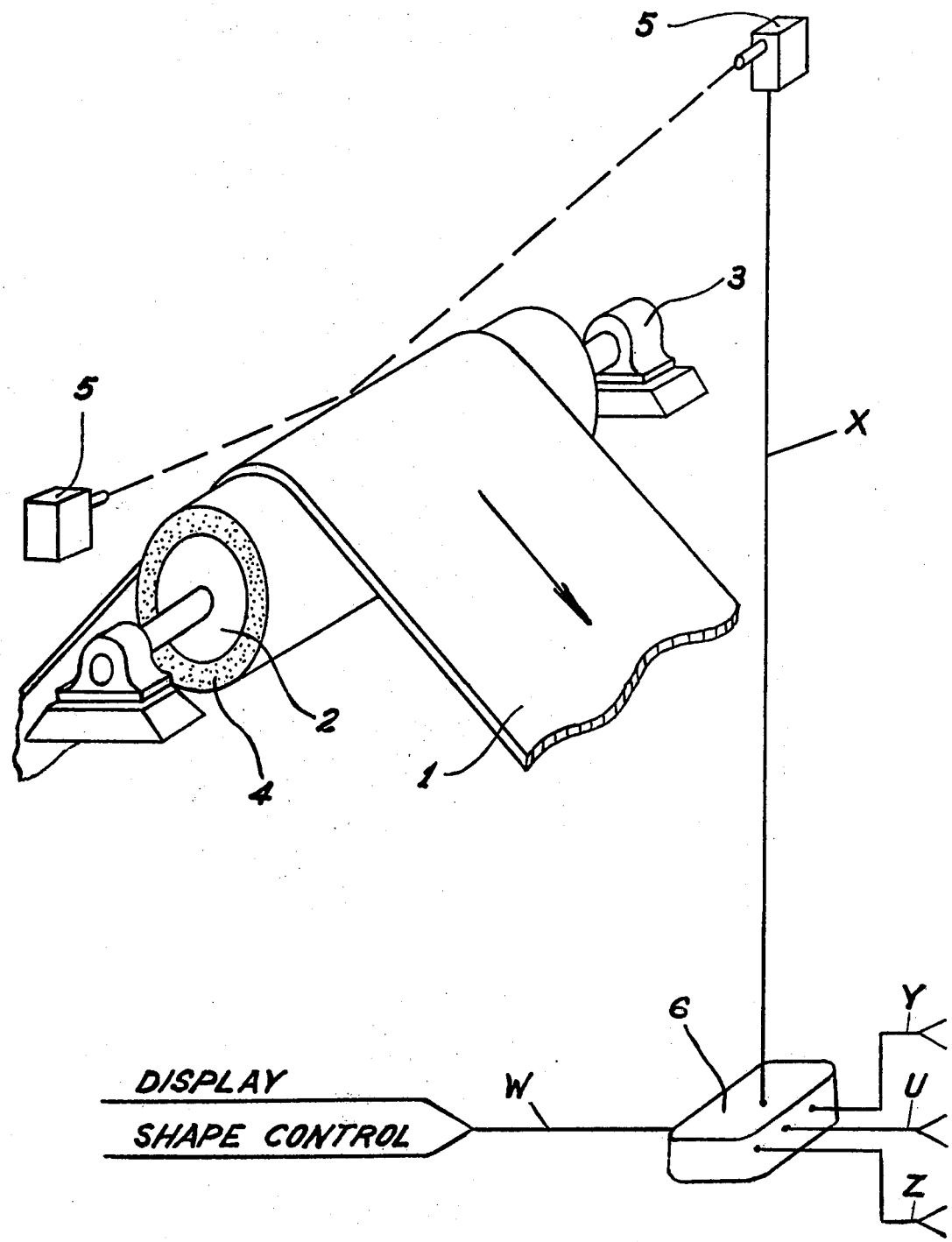

STRIP SHAPE MEASURING DEVICE

This invention relates to the processing of metal strip particularly that which has been reduced to its final thickness by cold rolling. Ideally, metal strip should be of constant thickness throughout and should also be completely flat. This flatness should also be retained even after the strip is sheared or slit into smaller portions, for this operation frequently releases residual stresses in the metal.

In practice strip flatness is extremely difficult to accomplish, and there is a tendency to overroll portions of the strip giving rise to the formation of centre or edge waves. Metal strip is usually cold rolled whilst being held under longitudinal tension so these edge or centre waves are not always obvious to a mill operator, additionally, such mills operate at high speed and with minimum operator supervisor so that even obvious waves, buckles and strip shape variations may not be detected.

Several methods of controlling the shape of metal strip are available, but these require a suitable means of shape measurement. Previous shape measuring systems have attempted to measure shape by detecting stress distribution across the strip width, either by a non-contact electromagnetic sensor, or by deflecting the strip over a segmented roll, and measuring the force exerted by the strip on each segment. A limitation of these methods is their inability to measure the shape variation, or stress distribution with any accuracy in the vicinity of buckled or wavy areas, and their limited resolution near the strip edges due to the finite size of the sensing devices, even when these are reduced to a practical minimum width.

To overcome this problem, the invention provides a method of measuring the shape of a moving strip, which method comprises passing the strip, held under tension, over a resilient deflection roll having a resilient outer surface, and measuring the depth of compression of the outer surface of said resilient deflection roll by the strip. The depth of compression is directly related to the stress distribution, which in turn is a measure of the variation in flatness.

The depth of compression may be measured by measuring the distance of one or both surfaces of the strip from a fixed datum at the required number of positions across the width of the strip. This may be accomplished by any known distance measuring device, for instance, a triangulation method using either a scanning light source, or a line beam - the light source generally being a laser. This distance measurement can then be translated into a shape signal, which represents the combined effect of internal stress variations and surface buckling caused by the elongation variations.

By way of example, one preferred form of the invention is shown in the drawing herewith, which is a schematic representation of a shape measuring device.

A longitudinally tensioned metal strip 1 moves in the direction of the arrow over deflection roll 2 which is freely rotatable about its shaft in bearings 3. Roll 2 may be of resilient material, or (as shown in the drawings) may be covered by a layer of resilient material 4 of uniform thickness. As the strip 1 passed over and partly around the roll 2, longitudinal stresses within the metal cause compression of the covering material 4.

The deflections of the strip can then be measured, for example by a scanning device 5 which may be electromagnetic or a laser device, whose output signal X represents the indentation of the strip into the resilient surface, after allowing for variations in strip thickness which can occur along and across the strip.

The scanning device may, for example, be any one of a number of known devices operating on the triangulation principle. Such scanning devices generally comprise a radiation source (which may, for example, be a laser), a scanner (which may, for example, comprise rotating mirrors or an electro-optic device), and a detector appropriate to the radiation being employed.

Independent measurements of the nominal thickness Y, thickness distribution or profile U and tension Z may be used to assist in processing the displacement signal by electronic circuitry or by a computer 6.

The processed signal W may then be displayed to an operator for manual shape correction, or transmitted to an automatic shape regulator.

Effects of strip vibration and tension Z variation can be minimised by suitably filtering or dampening the scanner output signals X.

The diameter of the deflection roll 2, the thickness of the resilient covering material 4 and the composition of the layer are determined by the mill requirements and metal characteristics. The roll may itself be of resilient material, in which case the resilient covering material 4 is not required. If, as shown, the roll itself is of substantially non-compressible material, the resilient covering may be a single layer, or multiple layers, not necessarily of similar materials, applied to the roll in any manner.

It may be desirable to provide perforations in the resilient covering, or in the sub-layers if any. Alternatively the roll surface may be "dimpled" or perforated to provide space in which the resilient material may flow under the effect of the stress applied to it by the metal strip. Alternatively the resilient material may have a cellular structure such as in foamed rubber, thus providing this "air space" effect.

Where the resilient covering, or the roll itself, is dimpled or perforated in some manner, such air spaces must be provided in a regular pattern across and round the roll surface, so that the deflection under any given load is constant for all areas.

In yet another embodiment, the deflection roll may be provided with a non-compressible but deformable outer sheath. Such an outer sheath may be of metal. The use of a metal outer sheath over one or more layers of resilient material allows the roll as a whole to be resilient but avoids contamination problems which are sometimes encountered with a non-metallic resilient outer layer in contact with chemicals or oils which may be present in the strip. A metal outer strip may also exhibit better wear characteristics.

We claim:
1. A method of determining stress variations in a strip of substantially flat material comprising the steps of:
    moving said strip of substantially flat material under tension of a deflection roll having a unitary compressible exterior extending continuously in a direction transverse to strip motion to cause the surface of said material passing over said roll to remain in compressive contact with the surface of said roll and compress said roll to a contour related to the stress distribution in said strip; and
    sensing the depth of compression of said deflection roll by optical scanning of the width of said strip of material along the contact surface of said deflection roll and said strip of material.

2. The method of claim 1 further including the step of controlling the shape of said strip in response to the sensed depth of compression of said deflection roll.

3. An apparatus for determining the stress variations in a moving strip of material held under tension comprising:
- a deflection roll freely rotatable about a shaft thereof and having a compressible exterior extending continuously a distance transverse to strip motion;
- said deflection roll further comprising a substantially non-compressible cylinder and a compressible outer cover having at least one layer of resilient material;
- means for moving said strip of material under tension over said roll to provide constant compressive contact with the roll surface resulting in compression of said roll surface to a degree related to strip stress distribution;
- means for sensing the depth of compression of said roll surface.

4. An apparatus according to claim 2 wherein one or more of said resilient layers are uniformly perforated or dimpled.

5. Apparatus according to claim 3, wherein said compressible covering comprises foamed rubber.

6. An apparatus for determining the stress variations in a moving strip of material held under tension comprising:
- a deflection roll freely rotatable about a shaft thereof and having a compressible exterior extending continuously a distance transverse to strip motion;
- said deflection roll comprising a substantially non-compressible cylinder and a compressible outer cover having at least one intermediate layer of resilient material, and a thin deformable outer layer of metal;
- means for moving said strip of material under tension over said roll to provide constant compressive contact with the roll surface resulting in compression of said roll surface to a degree related to strip stress distribution;
- means for sensing the depth of compression of said roll surface.

7. Apparatus for determining stress variations in a strip of substantially flat material comprising:
- a deflection roll;
- means for moving said strip of substantially flat material under tension over said deflection roll;
- said deflection roll having a unitary compressible exterior extending continuously in a direction transverse to strip motion to cause the surface of said material passing over said roll to remain in compressive contact with the surface of said roll and compress said roll to a contour related to the stress distribution in said strip; and
- means for sensing the depth of compression of said deflection roll by optical scanning of the width of said strip of material along the contact surface of said deflection roll and said strip of material.

8. An apparatus according to claim 7 wherein said optical scanning means includes a laser providing a scanning line beam.

* * * * *